(12) United States Patent
Annati et al.

(10) Patent No.: US 8,128,019 B2
(45) Date of Patent: Mar. 6, 2012

(54) HYBRID POWER FOR DUCTED FAN UNMANNED AERIAL SYSTEMS

(75) Inventors: Richard E. Annati, Albuquerque, NM (US); Patrick L. O'Brien, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 564 days.

(21) Appl. No.: 12/334,098

(22) Filed: Dec. 12, 2008

(65) Prior Publication Data

US 2010/0147993 A1  Jun. 17, 2010

(51) Int. Cl.
*B64C 29/00* (2006.01)

(52) U.S. Cl. .................. 244/23 A; 244/12.3

(58) Field of Classification Search ............. 244/7 A, 244/12.2, 12.4, 23 A, 23 C, 7 B; 416/170 R
See application file for complete search history.

(56) References Cited

U.S. PATENT DOCUMENTS

| | | | |
|---|---|---|---|
| 5,226,350 A | 7/1993 | Cycon et al. | |
| 5,758,716 A | 6/1998 | Shibata | |
| 5,836,542 A * | 11/1998 | Burns | 244/12.2 |
| 6,254,032 B1 * | 7/2001 | Bucher | 244/12.2 |
| 6,307,277 B1 | 10/2001 | Tamai et al. | |
| 6,376,927 B1 | 4/2002 | Tamai et al. | |
| 6,575,401 B1 * | 6/2003 | Carver | 244/12.2 |
| 6,976,653 B2 * | 12/2005 | Perlo et al. | 244/12.2 |
| 6,988,357 B2 | 1/2006 | Dev | |
| 7,032,861 B2 * | 4/2006 | Sanders et al. | 244/23 A |
| 7,219,490 B2 | 5/2007 | Dev | |
| 2006/0225404 A1 | 10/2006 | Dev | |

* cited by examiner

*Primary Examiner* — Tien Dinh
*Assistant Examiner* — Keith L Dixon
(74) *Attorney, Agent, or Firm* — Shumaker & Sieffert, P.A.

(57) ABSTRACT

A propulsion system for a vertical take-off and landing ducted fan aerial vehicle is provided, the propulsion system comprising an internal combustion engine, an electric motor that comprises a motor generator, a motor drive and a battery. The motor drive and battery are integrated into the aerial vehicle and provide power to the ducted fan aerial vehicle. The electric motor may comprise a ring motor generator. In operation, this dual propulsion system serves as a weight-efficient option to allow for two sources of power on a ducted fan unmanned aerial vehicle.

15 Claims, 6 Drawing Sheets

HYBRID POWER FOR DUCTED FAN UNMANNED AERIAL SYSTEMS

GOVERNMENT RIGHTS

This invention was made with Government support under Prime Contract Number MDA972-01-9-0018 awarded by DARPA. The Government may have certain rights in this invention.

FIELD

The present invention relates generally to unmanned aerial vehicles. More particularly, the present invention relates to hybrid power for use with an unmanned ducted fan vertical takeoff and landing (VTOL) aerial vehicle.

BACKGROUND

Unmanned aerial vehicles ("UAVs") are remotely piloted or self-piloted aircraft that can carry cameras, sensors, communications equipment, or other payloads. A UAV is capable of controlled, sustained, level flight and is often powered by either a gas turbine or a reciprocating internal combustion engine. The UAVs may be remotely controlled or may fly autonomously based on pre-programmed flight plans or more complex dynamic automation systems.

UAVs have become increasingly used for various applications where the use of manned flight vehicles is not appropriate or is not feasible. Such applications may include military situations, such as surveillance, reconnaissance, target acquisition, data acquisition, communications relay, decoy, harassment, or supply flights. These vehicles are also used in a growing number of civilian applications, such as firefighting when a human observer would be at risk, police observation of civil disturbances or crime scenes, reconnaissance support in natural disasters, and scientific research, such as collecting data from within a hurricane.

Ducted fan vertical take-off and landing (VTOL) UAVs offer a distinct operational functionality in comparison to conventional fixed wing UAVs. This increased functionality is related to the ability of the Ducted fan VTOL UAV to hover and stare. In a hover and stare maneuver the UAV can be stopped in flight and any sensors on the UAV can be used to closely investigate a point of interest while the vehicle remains stationary.

A typical mission profile begins with the UAV ascending to a specified altitude. Once the UAV reaches its specified altitude, the UAV then cruises to a specified location and hovers at that location. Cruise, hover, and altitude changes may occur multiple times during a mission. The mission profile is completed with the UAV cruising to the landing location, descending, and landing at that location. Different power levels are required during the different portions of the mission profile. Currently, a gas turbine engine or a reciprocating internal combustion engine ("ICE") are used to drive the rotating fan of the ducted fan propelled UAV. A gas turbine and an ICE are designed to produce peak efficiency at a specific power and speed, often referred to as the design point. The efficiency is reduced when the power and speed are varied from the design point. Throughout the mission profile, the engine is operated at many different power and speed conditions, resulting in less than optimum efficiency for certain legs of the profile. When the engine is not operating at optimum efficiency, higher fuel consumption results. Higher fuel consumption means the UAV cannot fly as far or as long as it could if the engine were operated at the design point throughout the entire mission profile.

Due to weight limitations, ducted fan UAVs typically have only one source of propulsive power. This is because two of any of the aforementioned power sources on a UAV would be too heavy of a load, resulting in decreased vehicle performance. However, if the one source of propulsive power fails to operate during a mission, or operates at a lower, uncontrolled manner, the result could be an uncontrolled flight or even a crash.

Also due to weight constraints, ducted fan UAVs with ICEs typically do not have an electrical starter or generator. Instead, electric power for flight is derived from an on-board battery. The battery level is slowly depleted during the mission. The depletion may limit flight time, thus limiting the utility of the vehicle. An ICE needs a significant torque applied to the crank shaft to be able to start. Typical small motors can supply high speed, but low torque. Without an electrical starter, the ducted fan UAV cannot land in a remote location with its engine turned off and then start up again to take off and resume the mission or return to base. This capability, commonly referred to as "perch and stare," is desirable because it allows the vehicle to fly to a remote location and land while remaining able to transmit data, such as video and still images, back to the operator.

SUMMARY

In accordance with the present invention, a dual propulsion system for an unmanned aerial vehicle is provided. This dual propulsion system provides for hybrid power that can power a ducted fan unmanned aerial vehicle so that the vehicle operates at its design peak throughout the entire mission profile.

In one embodiment, a propulsion system for a ducted fan aerial vehicle is provided. The propulsion system comprises an internal combustion engine and an electric motor generator. The electric motor is integrated into both the shroud of the propulsive fan and the duct on the aerial vehicle. The electric motor comprises a motor drive and a battery, and the motor provides power to the ducted fan UAV. The engine also provides power to the ducted fan UAV.

In another embodiment, an unmanned aerial vehicle comprises a propulsive fan, wherein the propulsive fan is driven by an engine and electric motor generator. The propulsive fan includes a first surface, and a motor-generator comprising a motor portion is integrated into the first surface. The motor portion of the motor generator provides propulsion power in addition to propulsion power provided by the internal combustion engine.

In a third embodiment, a ducted fan aerial vehicle is provided, the vehicle comprising an engine, a plurality of fan blades, and an electric motor-generator. Each of the plurality of fan blades comprises a first end and a second end, the first end being attached to a fan impeller and the second end comprising a periphery. The electric motor-generator is integrated into the periphery of at least one of the second ends of the plurality of fan blades. The engine and the electric motor-generator each provide power to the ducted fan vehicle.

BRIEF DESCRIPTION OF THE DRAWINGS

Various embodiments are described herein with reference to the following drawings. Certain aspects of the drawings are depicted in a simplified way for reason of clarity. Not all alternatives and options are shown in the drawings and, therefore, the invention is not limited in scope to the content of the drawings. In the drawings:

FIG. 3b illustrates the power required for the mission profile of FIG. 3a;

DETAILED DESCRIPTION

Figure 1:
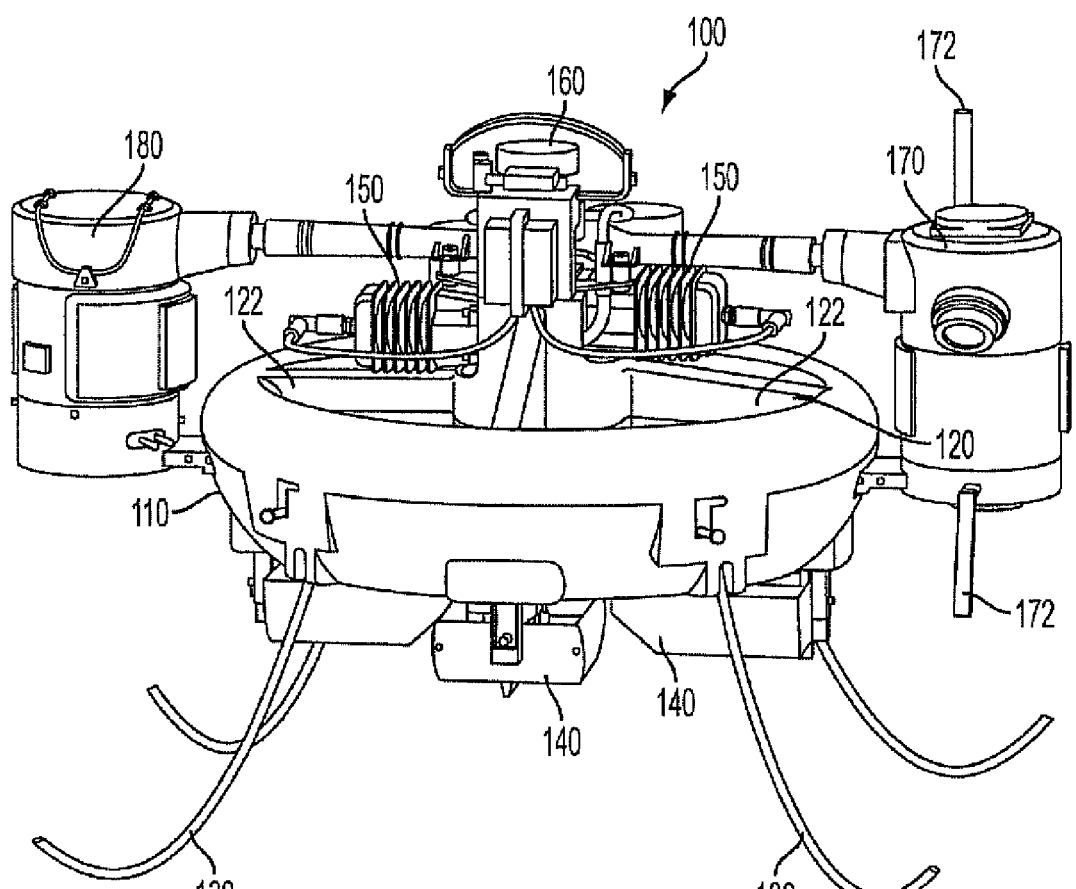
FIG. 1 is a perspective view of a hybrid power ducted fan unmanned aerial vehicle according to one embodiment of the invention.

FIG. 1 depicts a perspective view of a ducted fan unmanned aerial vehicle ("ducted fan UAV") 100 according to one embodiment of the present invention.

The UAV 100 includes an air duct 110 and a fan 120 located within the air duct 110. Fan 120 includes a plurality of fan blades 122. The UAV may have landing gear 130, a plurality of control vanes 140, engine cylinders 150, an engine filter 160, a payload pod 170, and an avionics pod 180. Payload pod 170 may comprise a plurality of antennas 172. In one embodiment, the engine may be a gas turbine internal combustion engine. In another embodiment, the engine may be a reciprocating internal combustion engine ("ICE"). An electric motor may also be present. The electric motor controls the rotation of fan blades 122 of UAV 100. The electric motor may be connected to the engine and fan 120 with a shaft, gearbox, belt, or chain.

Payload pod 170 and avionics pod 180 are merely exemplary pods that may be mounted onto UAV 100. A variety of pods that may be used for a variety of purposes may be used.

Figure 2:
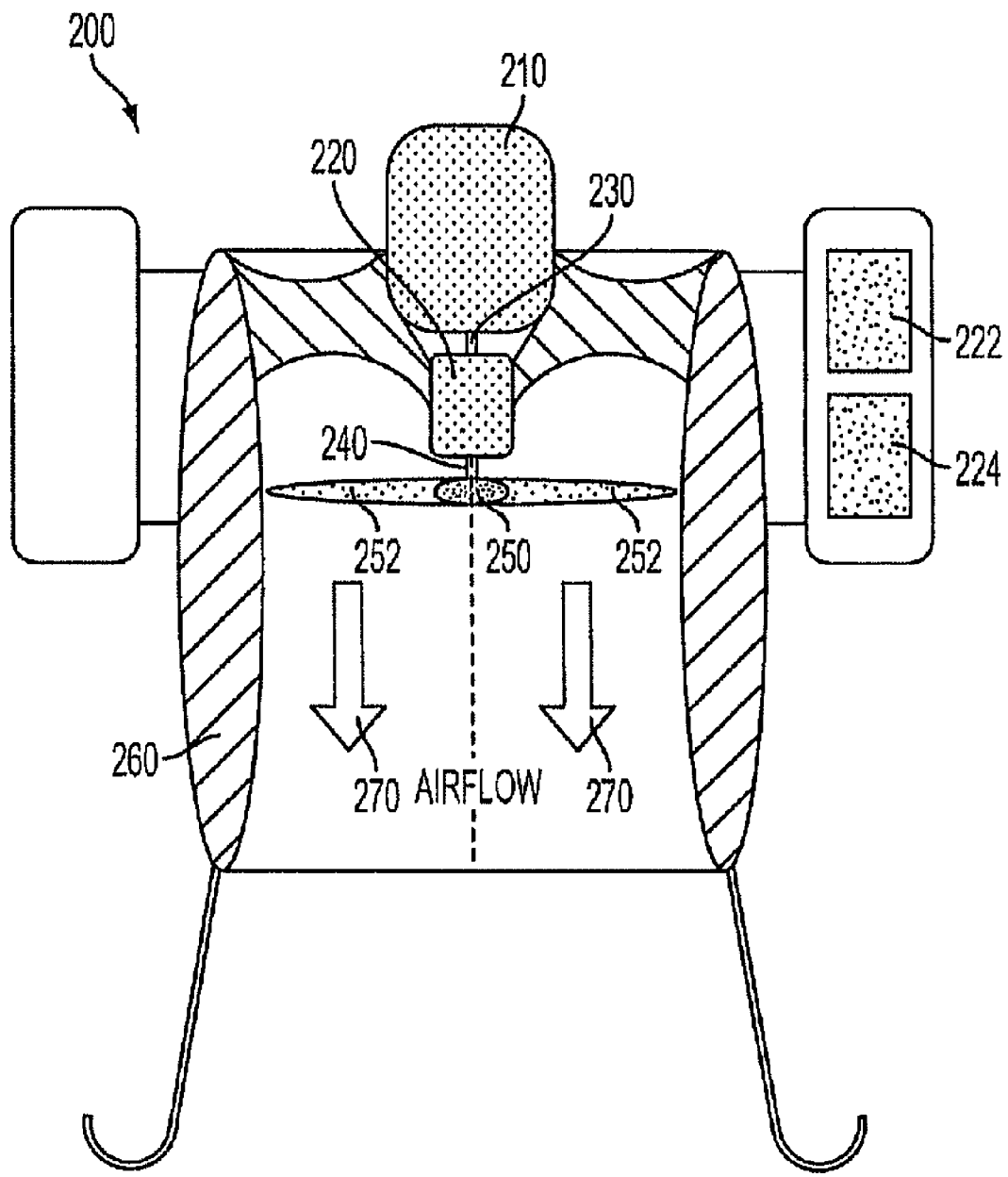
FIG. 2 is a block diagram of a hybrid power ducted fan unmanned aerial vehicle.

FIG. 2 is a block diagram of a hybrid ducted fan UAV 200. UAV 200 shows the dual propulsion system that includes an internal combustion engine 210 and an electric motor 220, as well as a motor drive 222 and a battery 224. A first shaft 230 connects engine 210 to electric motor 220. A second shaft 240 connects electric motor 220 to a fan impeller 250. In an alternative embodiment, only one shaft may be used and engine 210 and electric motor 220 may be mounted on the single shaft. In this embodiment, the single shaft may connect electric motor to fan impeller 250. A plurality of fan blades 252 of the fan impeller 250 move in either a clockwise or counter-clockwise direction within a duct 260. Engine 210 and electric motor 220 are attached to duct 260. Fan impeller 250 rotates as air flows over fan blades 252 and the fan blades move in either the clockwise or counter-clockwise direction. The direction of airflow is shown with arrows 270. Battery 224 and motor drive 222 may be attached to the duct 260, and may be connected to electric motor 220. UAV 200 may also include landing gear.

Electric motor 220 may be a ring motor-generator. A ring motor is an electric machine constructed at the outside circumference of fan blades 252 and comprises magnetic elements and windings arranged to produce rotation of the fan impeller 250. The magnetic elements can be integrated into the rotation fan circumference, and the windings may be integrated into the fan duct.

The motor-generator may be a single electric machine that can be used as either a motor or a generator, and may convert electric power into mechanical power. The motor-generator may convert mechanical power into electric power. The motor-generator may be integrated into duct 260. The motor-generator may be operated as a motor for power augmentation of engine 210. In this embodiment, the motor drive 222 would use DC power from battery 224 and would invert the DC power to variable frequency to start and drive the motor-generator as a motor. When generator power is needed, motor drive 222 may then act as a rectifier and a voltage regulator to supply power at the correct voltage and current to battery 224 for recharging, as well as electrical power for on-board power needs.

Alternatively, electric motor 220 may not be a motor-generator, and instead may solely comprise a motor. Electric motor 220 may be a DC motor that has a coil of wire that rotates in a magnetic field. In this case, the current in the coil may be supplied via two brushes that make moving contact with a split ring. The coil would lie in a steady magnetic field, and the forces exerted on the current-carrying wires would create a torque on the coil. The torque creates mechanical energy that may be used to turn fan impeller 250.

Battery 224 may be a light weight rechargeable type such as, but not limited to, lithium polymer, or nickel metal hydride. Engine 210 may drive a generator to recharge battery 224, but other means such as photovoltaic may be used. Battery 224 may supply power to motor drive for up to multiple hours depending upon the size and payload capacity of the air vehicle. There may be more than one battery 224 used with UAV 200.

In operation, engine 210 may be turned on to power UAV 200. Electric motor 220 may be used to only start engine 210, to start and run engine 210 simultaneously, or the electric motor 220 may be started at a later point in time from engine 210. Electric motor 220 may, alternatively, be turned on when engine 210 is not turned on. Battery 224 charges motor drive 222, sending electrical energy to electric motor 220. Electric motor 220 uses the electrical energy to produce mechanical energy. Motor drive 222 may control the rotational speed of electric motor 220. Generally, the rotational speed and torque of a brushless DC motor is proportional to the voltage, current, and frequency applied to it. Thus, speed control may be achieved by commutation frequency, voltage, and current from the motor drive 222. Each of engine 210 and electric motor 220 can power UAV 200 to lift the UAV off the ground and move in the air to a determined location.

Figure 3A:
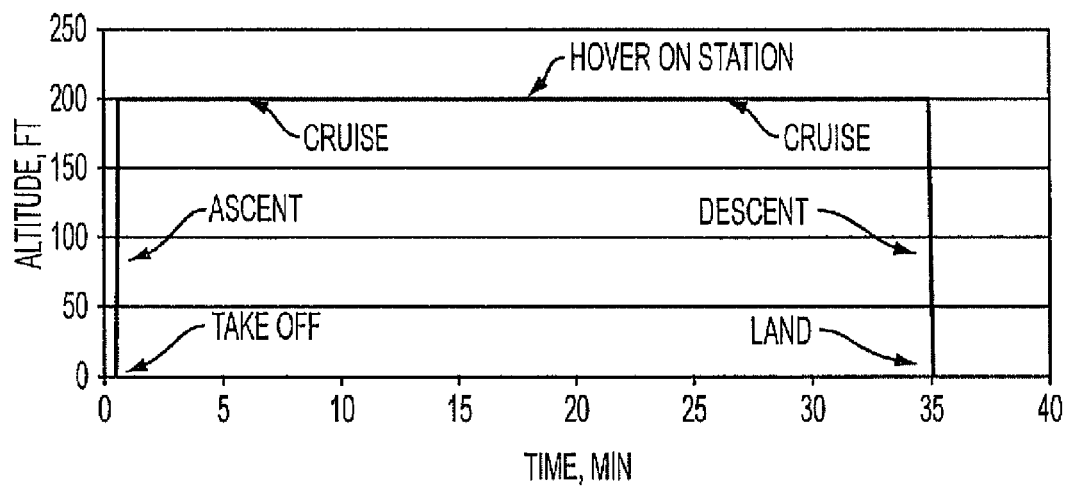
FIG. 3a is an exemplary mission profile for a ducted fan unmanned aerial vehicle.

The dual propulsion system shown in FIG. 2 allows engine 210 to be operated at or near the design point throughout most of the mission, resulting in maximum engine efficiency, and thus lower fuel consumption. In operation, when higher power is needed, electric motor 220 is activated to augment the engine power. FIG. 3a shows a typical mission profile including take off, ascent, cruise, hover, cruise, descent, and landing. In FIG. 3a, the vertical axis represents the altitude, measured in feet, at which UAV 100 is flying. The horizontal axis represents the time elapsed in minutes. As shown in FIG. 3a, take off and ascent take very little time but the altitude climbed is very high, up to 200 ft. Cruising and hovering last for 35 minutes in the example in FIG. 3a. Descent and landing take very little time, but the altitude change is large, 200 ft descent. This is one example of a multitude of mission profiles that may vary considerably in altitude and time.

Figure 3B:
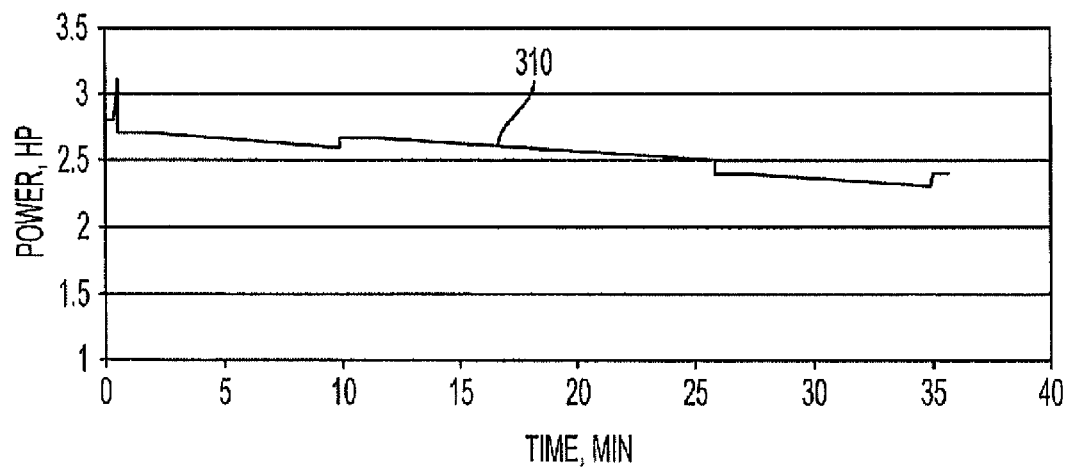

FIG. 3b shows power required for the flight pattern of FIG. 3a. FIG. 3b displays power, measured in horsepower on the vertical axis, versus the time elapsed throughout the flight pattern of FIG. 3a. A power required for flight 310 line is shown in FIG. 3b. The power required for flight 310 line shows that more power is required during ascent, descent, and hover than required during cruise. The increase in power can be seen at the moment of take off and ascent, from approximately 2.75 hp to over 3 hp. Once UAV 100 has reached its cruising altitude, the power required decreases sharply to a value below 2.75 hp, and then continues to decrease in a more gradual manner until approximately the tenth minute. UAV 100 then experiences a slight increase in power required as the UAV changes to hover mode, and then continues to decrease gradually while hovering until the $25^{th}$ minute, where the UAV experiences a sharp decrease in power as the UAV switches to cruise mode. The UAV continues to use less power in cruise mode, and requires only a slight, sharp increase of power for the descent phase of the mission profile.

Figure 3C:
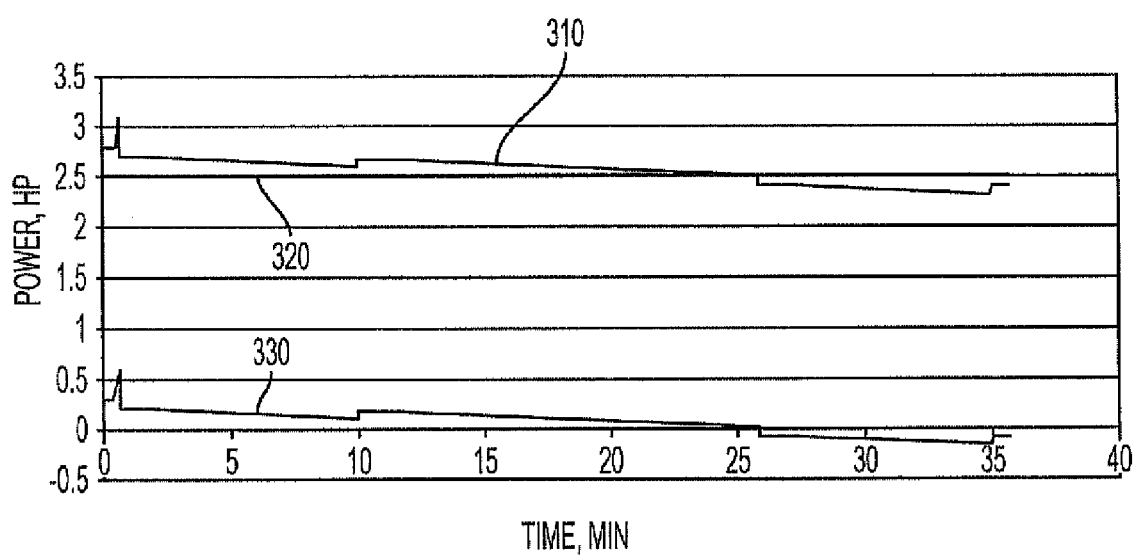
FIG. 3c illustrates an exemplary use of power for the mission profile of FIG. 3b.

FIG. 3c is a chart illustrating the power used with a hybrid dual power system for the mission profile of FIG. 3a. There are three lines on FIGS. 3c, 310, 320 and 330. ICE power line 320 shows the constant power required from the ICE to allow for the continuous function at the design point. Electric motor power line 330 shows the power generated from use of the electric motor. The power dips below zero for a period of time as the ICE drives the generator to recharge the batteries. A power required for flight 310 line shows the same power required profile of FIG. 3b. As shown in FIG. 3c, the engine would be designed to achieve maximum efficiency at its design point, and would be operated at that design point during most of the mission profile. When more power is needed during ascent, descent, and hover, the electric motor would be activated in parallel with the engine, supplying additional power to achieve the higher total power required. When less power is needed, the electric motor would be turned off, and run as a generator, turning mechanical power into electrical power, to recharge the batteries.

In addition to increased efficiency, electric motor 220 provides a second source of power that is available for propulsion in the case that engine 210 fails. The electric motor 220 would, at a minimum, allow the fan impeller 250 to rotate fast enough and provide enough airflow for the control surfaces (e.g. vanes) to take effect and allow for a controlled descent. A clutch system may be used to disengage a seized engine and allow the electric motor to rotate the fan. The clutch may be a centrifugal or electrically engaged clutch that disconnects the engine from the electric motor.

If electric motor 220 is a motor-generator, the motor-generator can be operated either as a motor or as a generator. When more power is needed, such as during ascent, electric motor 220 may be operated as a motor to augment engine 210 power. When less power is needed, electric motor 220 may operate as a generator and supply power to on-board loads and recharge the battery. Furthermore, when on the ground, electric motor 220 as a motor-generator could be driven by the engine and operated as an auxiliary generator for other power needs outside of UAV 200.

Figure 4A:
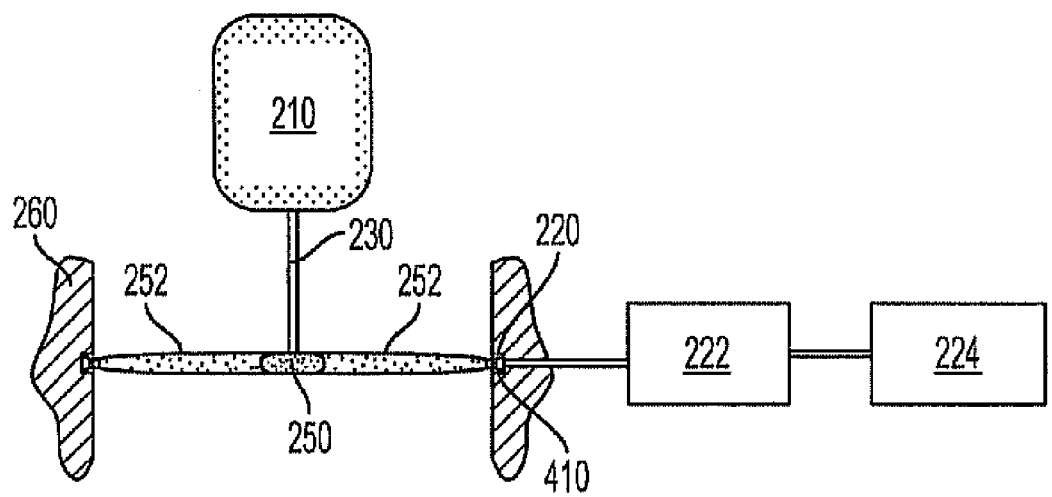
FIG. 4a is an exemplary hybrid power ducted fan unmanned aerial vehicle, wherein the electric motor comprises a ring motor design.
Figure 4B:
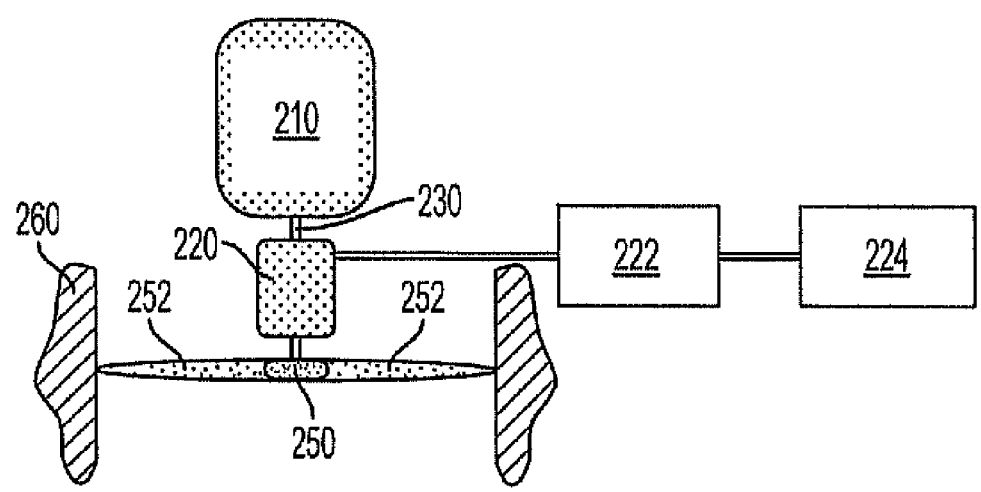
FIG. 4b is an exemplary hybrid power ducted fan unmanned aerial vehicle comprising a conventional electric motor mounted on the shaft.
Figure 4C:
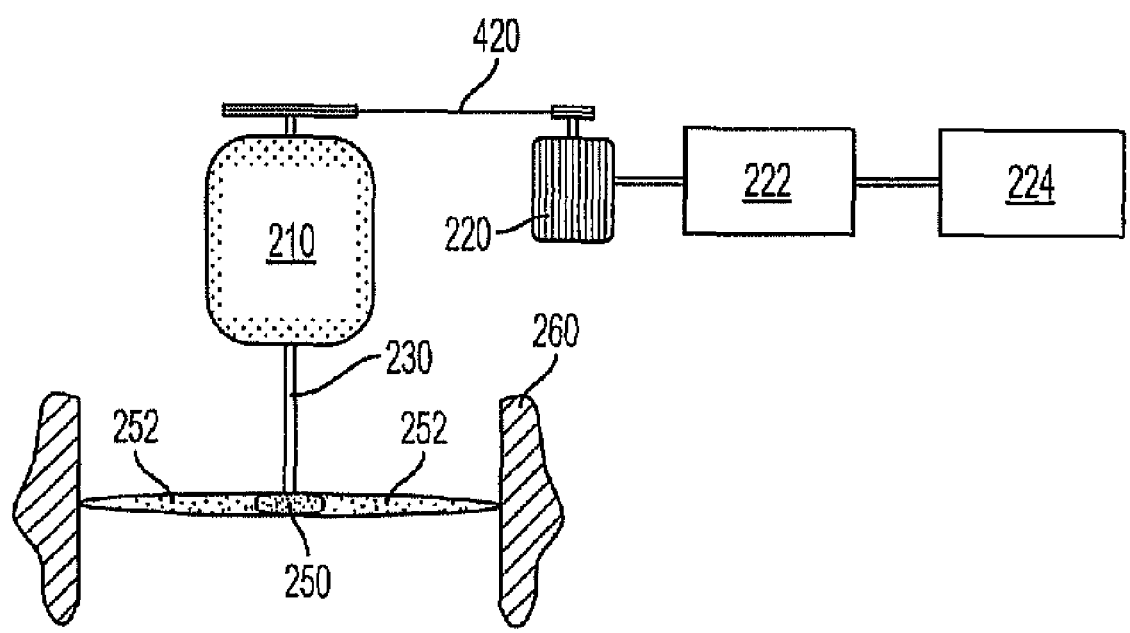
FIG. 4c is an exemplary hybrid power ducted fan unmanned aerial vehicle comprising an electrical motor connected by a belt or chain drive to the shaft.

FIGS. 4a-4c show alternative embodiments for electric motor 220. FIG. 4a is an exemplary hybrid power ducted fan UAV, wherein the electric motor comprises a ring motor design. The hybrid UAV may serve as an engine starter to remotely start the engine by using battery power or another source of power. For this embodiment, electric motor 220 may comprise a ring motor design, wherein magnetic elements 410 positioned at the periphery of the fan blades 252 would be propulsed by windings located near the duct 260. By using a ring motor design, the motor diameter is large, but the motor mass is small. The large diameter results in more torque which is needed to start the engine 210.

Additional embodiments may include a conventional electric motor 220 mounted on the shaft after engine 210, as shown in FIG. 4b, or the electric motor 220 may be connected to the shaft via a belt or chain drive 420 as shown in FIG. 4c. Alternatively, the electric motor 220 of FIG. 4b may be mounted on the shaft before engine 210.

UAV 100 may be designed to be transported in a backpack. A modular lightweight load carrying equipment pack ("MOLLE") is an Army and Marine Corps backpack. The MOLLE pack is a fully integrated, modular load bearing system consisting of a load bearing vest with butt pack, main nick with sustainment pouches and sleeping bag compartment attached to an external frame. There is also a patrol pack, which can be used separately or combined with the main nick for added load carrying capability. MOLLE can be configured in several different variations to fit the load handling needs of the mission. The load-bearing vest is typically worn and holds pockets for magazines and hand grenades. Although UAV 100 is preferably designed to fit within a MOLLE pack, UAV 100 may fit into a number of other bags or backpacks. UAV 100 may be used in non-military applications, and might not be housed within a pack for those applications.

UAV 100 may weigh approximately 16-18 lbs. However, UAV 100 may weigh more or less than this value, depending on the materials used and the size of the UAV. The UAV may operate at altitudes of 100 to 500 feet above ground level, and typically the UAV will fly between 10 and 500 feet above the ground, but may also fly at higher altitudes. The UAV can provide forward and down-looking day or night video or still imagery. The UAV may operate in a variety of weather conditions including rain and moderate winds. The system requires minimal operator training Portable ground stations may be used to guide the aircraft and receive images from the cameras. The ground station can be used to program a flight path for the UAV or control it manually. The aircraft can also be equipped with electro-optical cameras for daylight operations or infrared cameras for night missions.

UAV 100 may run autonomously, executing simple missions such as a program or reconnaissance, or it may run under the control of a crew. The crew may comprise a pilot and sensor operators. The pilot may drive the aircraft using controls that transmit commands over a C-band line-of-sight data link, or a Ku-Band satellite link, or other data link. The aircraft may also receive orders via an L-3 Com satellite data link system. The pilots and other crew members use images and radar received from the aircraft to make decisions regarding control of the UAV.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:
1. A propulsion system for a vertical take-off and landing ducted fan aerial vehicle, the propulsion system comprising:
   a fan comprising a fan impeller, wherein the fan is located within an air duct;
   an engine configured to rotate the fan impeller; and
   an electric motor, wherein the electric motor is connected to the fan impeller and the engine, and wherein the engine and the electric motor are configured to simultaneously rotate the fan impeller to provide power to the ducted fan aerial vehicle.

2. The propulsion system of claim 1, wherein the electric motor is a motor-generator.

3. The propulsion system of claim 1, further comprising a plurality of fan blades that define a periphery, wherein the fan impeller is connected to each fan blade of the plurality of fan blades, and wherein the electric motor is integrated into the periphery defined by the plurality of fan blades.

4. The propulsion system of claim 3, wherein the electric motor is a ring motor comprising magnetic elements and electrical windings, and wherein the electrical windings are located at the periphery of the fan blades and an interior surface of the air duct.

5. The propulsion system of claim 1, wherein the electric motor serves as an engine starter for the ducted fan aerial vehicle.

6. The propulsion system of claim 1, wherein the electric motor is configured to power the unmanned aerial vehicle when the engine fails.

7. A ducted fan aerial vehicle, comprising:
   an engine;
   a ducted fan comprising a plurality of fan blades, wherein each fan blade of the plurality of fan blades comprises an end, and the end of each fan blade of the plurality of fan blades defines a periphery; and
   an electric ring motor, wherein the electric ring motor is integrated into the periphery defined by the ends of the fan blades of the plurality of fan blades, and wherein the engine and the electric ring motor are configured to simultaneously rotate the plurality of fan blades of the ducted fan.

8. The propulsion system of claim 1, further comprising a shaft connected to the fan impeller, wherein the electric motor and the engine are each configured to rotate the fan impeller by rotating the shaft.

9. The propulsion system of claim 8, further comprising a clutch, wherein the clutch is configured to disengage the engine from the shaft and allow the electric motor to rotate the shaft without resistance from the engine.

10. The propulsion system of claim 8, further comprising a clutch, wherein the clutch is configured to disengage the electric motor from the shaft and allow the engine to rotate the shaft without resistance from the electric motor.

11. The propulsion system of claim 8, further comprising a chain drive that connects the electric motor and the shaft.

12. The propulsion system of claim 8, wherein the engine is mounted on the shaft between the electric motor and the fan impeller.

13. The propulsion system of claim 1, wherein the engine comprises at least one of an internal combustion engine or a turbine engine.

14. The propulsion system of claim 2, further comprising a battery, wherein the engine is configured to provide mechanical energy to the motor-generator and the motor-generator is configured to convert the mechanical energy into electrical energy to recharge the battery.

15. The propulsion system of claim 1, wherein the electric motor comprises a ring motor.

* * * * *